United States Patent [19]
Hamano et al.

[11] Patent Number: 5,470,665
[45] Date of Patent: Nov. 28, 1995

[54] BIAXIALLY ORIENTED UNIDIRECTIONALLY LONG POLYETHYLENE-2, 6-NAPHTHALENEDICARBOXYLATE FILM

[75] Inventors: Hisashi Hamano; Masahiro Hosoi; Ieyasu Kobayshi; Yasuhiro Saeki, all of Sagamihara, Japan

[73] Assignee: Teijin, Ltd., Osaka, Japan

[21] Appl. No.: 414,137

[22] Filed: Mar. 30, 1995

Related U.S. Application Data

[63] Continuation of Ser. No. 16,259, Feb. 11, 1993, abandoned.
[51] Int. Cl.$^6$ .............................. B32B 27/06; B32B 27/36
[52] U.S. Cl. ...................... 428/480; 428/141; 428/336; 428/458; 428/910; 427/128; 528/272; 528/304; 528/308
[58] Field of Search .................................... 528/272, 308, 528/304; 428/480, 910, 141, 336, 458; 427/128

[56] References Cited

FOREIGN PATENT DOCUMENTS 0226162  6/1987  European Pat. Off. .
0500018  8/1992  European Pat. Off. .

Primary Examiner—James J. Seidleck
Assistant Examiner—Ric Truong
Attorney, Agent, or Firm—Sherman & Shalloway

[57] ABSTRACT

Provided is a biaxially oriented, unidirectionally long polyethylene-2,6-naphthalenedicarboxylate film having the following characteristic properties;

(A) both the Young's modulus in the longitudinal direction and the Young's modulus in the transverse direction are at least 600 kg/mm$^2$, and the Young's modulus in the longitudinal direction is greater than the Young's modulus in the transverse direction, (B) the heat shrinkage factor in the transverse direction when the film has been treated under no load at 105° C. for 30 minutes is at least 1%, and (C) the surface roughness Ra of one surface of the film is up to 5 nm, and a magnetic recording tape obtained by forming a thin magnetic metal film on the above film undergoes no curling, has high coercive force, has excellent electromagnetic conversion characteristic and permits high-density recording for a long period of time.

16 Claims, 1 Drawing Sheet

1

BIAXIALLY ORIENTED UNIDIRECTIONALLY LONG POLYETHYLENE-2, 6-NAPHTHALENEDICARBOXYLATE FILM

This application is a continuation of application Ser. No. 08/016,259, filed Feb. 11, 1993, now abandoned.

BACKGROUND OF THE INVENTION

1. Field of the Invention

The present invention relates to a biaxially oriented, unidirectionally long polyethylene-2,6-naphthalenedicarboxylate film. More specifically, it relates to a biaxially oriented, unidirectionally long polyethylene-2,6-naphthalenedicarboxylate film useful as a substrate film for a magnetic recording medium for high-density recording, which is capable of recording for a long period of time and excellent in electromagnetic conversion characteristics, particularly a magnetic recording medium having a thin magnetic metal film formed by vapor deposition such as a magnetic recording tape for use with VTR.

2. Prior Art

As a magnetic recording film which has high coercive force for magnetic recording and is capable of recording for a long period of time, there has been proposed a magnetic recording tape which is obtained by preparing, as a substrate, a biaxially oriented polyethylene-2,6-naphthalenedicarboxylate film having specific mechanical properties and a specific surface structure, forming a magnetic layer of a thin metal film on one surface of the substrate and forming a coating of an organic polymer containing a lubricant on the other surface of the substrate where no thin magnetic metal film is formed. This magnetic recording film has an improved coercive force for magnetic recording due to the use of a polyethylene-2,6-naphthalenedicarboxylate film having a stress of at least 18 kg/mm$^2$ when elongated in the longitudinal direction by 5%, a Young's modulus of at least 800 kg/mm$^2$ in the longitudinal direction and a Young's modulus of at least 500 kg/mm$^2$ in the transverse direction.

However, the above film still involves problems in that the substrate film undergoes curling when a thin metal film is formed thereon by vapor deposition and causes a trouble in running at a step of forming a magnetic recording tape, that the tape fails to give an adequate output or the tape runs unstably since it has curling and falls to be in good contact with a magnetic head when used after the tape has been taken up and encased in a cassette.

SUMMARY OF THE INVENTION

It is an object of the present invention to provide a novel biaxially oriented, unidirectionally long polyethylene-2,6-naphthalenedicarboxylate film.

It is another object of the present invention to provide a biaxially oriented, unidirectionally long polyethylene-2,6-naphthalenedicarboxylate film excellent as a substrate film for a magnetic recording tape.

It is further another object of the present invention to provide a biaxially oriented, unidirectionally long polyethylene-2,6-naphthalenedicarboxylate film which is almost free of curling when a thin metal film is formed thereon by vapor deposition and is excellent as a substrate film for a magnetic recording tape.

It is still further another object of the present invention to provide a biaxially oriented, unidirectionally long polyethylene-2,6-naphthalenedicarboxylate film which can give a high-density magnetic recording tape having a high coercive force, being substantially free from data dropout and being excellent in running properties and durability even in a small thickness and which is excellent as a substrate film for a magnetic recording tape.

The above objects and advantages of the present invention are achieved, first, by a biaxially oriented, unidirectionally long polyethylene-2,6-naphthalenedicarboxylate film having the following properties;

(A) both the Young's modulus in the longitudinal direction and the Young's modulus in the transverse direction are at least 600 kg/mm$^2$ and the Young's modulus in the longitudinal direction is greater than the Young's modulus in the transverse direction, (B) the heat shrinkage factor in the transverse direction when the film has been treated under no load at 105° C. for 30 minutes is at least 14, and (C) the surface roughness, Ra, of One surface of the film is up to 5 nm.

Further, according to the present invention, there is provided a magnetic recording tape obtained by forming a thin magnetic metal film as a magnetic recording layer on one surface of the above biaxially oriented, unidirectionally long polyethylene-2,6-nahthalenedicarboxylate film, by vapor-deposition.

DETAILED DESCRIPTION OF THE INVENTION

Figure 1:
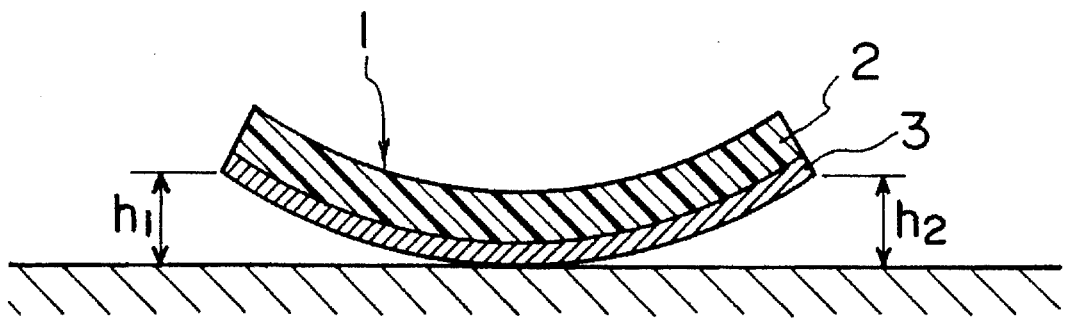
FIG. 1 a schematic view showing a method of evaluating the curling of a magnetic recording tape.

In the biaxially oriented, unidirectionally long polyethylene-2,6-naphthalenedicarboxylate film of the present invention, the Young's modulus (EM) in the longitudinal direction is at least 600 kg/mm$^2$, preferably at least 650 kg/mm$^2$ more preferably at least 700 kg/mm$^2$, particularly preferably at least 750 kg/mm$^2$. The upper limit of the Young's modulus in the longitudinal direction is generally about 1,500 kg/mm$^2$.

Due to the above high Young's modulus in the longitudinal direction, the tape can elongate and suffers less deformation when a strong instantaneous stress is exerted on the tape.

In the biaxially oriented, unidirectionally long polyethylene-2,6-naphthalenedicarboxylate film of the present invention, the Young's modulus (ET) in the transverse direction is at least 600 kg/mm$^2$, preferably at least 650 kg/mm$^2$, more preferably at least 700 kg/mm$^2$. The Young's modulus in the transverse direction is generally about 1,000 kg/mm$^2$.

Due to the above high Young's modulus in the transverse direction, there is a decrease in occurrence of a phenomenon that the tape edge is deformed in a wavy shape or bent while running.

In the biaxially oriented, unidirectionally long polyethylene-2,6-naphthalenedicarboxylate film of the present invention, the Young's modulus in the longitudinal direction is greater than the Young's modulus in the transverse direction. When the so-designed film is used, the magnetic tape is properly kept in contact with a video rotary head, and the excellent electromagnetic conversion characteristics are maintained.

The biaxially oriented, unidirectionally long polyethylene-2,6-naphthalenedicarboxylate film can be imparted with the above-described values of the Young's modulus in the longitudinal direction and the Young's modulus in the transverse direction by a method known per se. That is, the film may be biaxially stretched simultaneously or may be stretched consecutively, i.e., first in the longitudinal direction and then in the transverse direction, or may be stretched in the longitudinal direction and the transverse direction at least two times each. The stretching can be carried out with a usual roll or a stenter.

When the biaxially oriented, unidirectionally long polyethylene-2,6-naphthalenedicarboxylate film of the present invention has been treated under no load at 105° C. for 30 minutes, the heat shrinkage factor in the transverse direction is at least 1%, preferably 1 to 3%. Due to such a high value of the heat shrinkage factor, the unidirectionally long film of the present invention undergoes little curling when a thin metal film is formed on its surface by vapor deposition.

The above high value of the heat shrinkage factor can be achieved by heat-treating the stretched film at a low temperature in a film production step. When the stretched film is heat-treated at too low a temperature, however, the heat shrinkage factor in the longitudinal direction increases, for example, more than 1% while the Young's modulus in the longitudinal direction is low. Therefore, scratching frequently occurs in the processing for forming a magnetic tape, and the scratch dust adheres to the magnetic surface of the magnetic tape to cause a drop-out, decrease the contact pressure to a magnetic head and decrease the dimensional stability. As a result, the electromagnetic conversion characteristics are deteriorated. The proper temperature for the above heat treatment can be determined by a preliminary experiment.

As another method, the above high value of the heat shrinkage factor can be achieved by increasing the stretch ratio in the transverse direction. However, when the stretch ratio in the transverse direction is too high, the orientation in the transverse direction strengthens to increase the Young's modulus in the transverse direction and decrease the Young's modulus in the longitudinal direction, which ends in the same results as those when the temperature for the heat treatment is too low. Further, when a thin magnetic metal film is formed by vapor deposition, the film undergoes curling. The proper stretch ratio in the transverse direction can be determined by a preliminary experiment.

Naturally, the heat shrinkage factor in the transverse direction may be adjusted to the above-described range by any other method.

When the biaxially oriented, unidirectionally long polyethylene-2,6-naphthalenedicarboxylate film of the present invention has been heat-treated under no load at 105° C. for 30 minutes, the heat shrinkage factor in the longitudinal direction is preferably 1% or less, more preferably 0.8% or less, particularly preferably 0.5% or less. Due to adjustment of the heat shrinkage factor in the longitudinal direction to the above-described range, the deformation of the film is small when processed to form a magnetic recording tape or stored in atmosphere at high temperatures. Further, the occurrence of scratches and scratch dust on the magnetic surface or running surface desirably decreases.

The above-specified heat shrinkage factor after the heat treatment at 105° C. for 30 minutes can be achieved by properly selecting the temperature for heat treatment of the stretched film in a film production step. It can be also achieved by further subjecting the film, which has been heat-treated above, to relaxation treatment between two rolls having a velocity difference at a temperature equal to or higher than the glass transition temperature of polyethylene-2,6-naphthalenedicarboxylate. However, the method of achieving the above heat shrinkage factor shall not be limited to the above-described ones.

In the biaxially oriented, unidirectionally long polyethylene-2,6-naphthalenedicarboxylate film of the present invention, the surface roughness Ra of one surface is 5 nm or less, preferably 1 to 4 nm. Due to the above surface roughness of one surface, there can be obtained a high-density high-sensitivity magnetic tape.

The surface having the above-specified surface roughness refers to a surface on which a thin metal film is to be formed. A magnetic recording tape obtained by forming a thin metal film on the above surface of the film of the present invention can have a proper gap between a magnetic head and the tape, and is excellent in electromagnetic conversion characteristics. When the Ra value is too small, the friction coefficient of the film is large and it is difficult to handle and take up the film.

The surface roughness Ra can be achieved, for example, by incorporating into the film inert fine particles such as inorganic fine particles containing elements coming under the group IIA, IIB, IVA and IVB of the periodic table or fine particles formed of a highly heat-resistant polymer such as a silicone resin and a crosslinked polystyrene, or by subjecting the film to a surface treatment such as coating treatment. When inert fine particles are used, it is preferred to incorporate about 0.1% by weight of fine silica particles having an average particle diameter of 0.045 μm into polyethylene-2,6-naphthalenedicarboxylate.

In the biaxially oriented, unidirectionally long polyethylene-2,6-naphthalenedicarboxylate film of the present invention, the surface roughness Ra of the other surface where the thin magnetic metal film is not formed is not specially limited. The surface roughness of the surface that is not to be coated with a thin metal film is preferably greater than that of the surface to be coated with a thin metal film. When, however, the other surface is imparted with a surface roughness of at least 5 nm or preferably 15 to 40 nm by forming a continuous or discrete organic polymer coating containing a lubricant, the film exhibits excellent lubrication and excellent handling, and there can be obtained a magnetic recording tape having improved running properties. The thickness of the coating is preferably 1 μm or less, more preferably approximately 50 to 500 nm. The lubricant to be contained in the organic polymer coating includes aluminum acrylate, molybdenum, fine silica and a fluorine resin, although the lubricant shall not be limited to these. The average particle diameter of the lubricant is preferably 0.1 to 2 μm, and the amount of the lubricant is preferably approximately 0.05 to 0.5% by weight based on a binder.

The above organic polymer coating is formed, for example, by dispersing the lubricant in a solution or emulsion of polyether such as glycidyl ether of polyoxyalkylene glycol or copolyester modified with an acid component such as naphthalene-2,6-dicarboxylic acid or aliphatic dicarboxylic acid and applying the resultant coating liquid to the other surface of the film.

The discrete coating can be formed, for example, by applying the coating liquid at a proper step before the film is stretched in the transverse direction in the process for producing the film of the present invention, heating the applied coating liquid to form a solidified coating, and stretching the film in the transverse direction. When the film is stretched in the transverse direction while the applied coating liquid is viscous, the continuous coating can be obtained. Naturally, the method for forming the continuous or discrete coating shall not be limited to the above.

Although not specially limited, the thickness of the unidirectionally long polyethylene-2,6-naphthalenedicarboxylate film of the present invention is preferably 75 μm or less. In order to cope with a decrease in the substrate film thickness following the improvement in the strength of a magnetic layer, the above thickness is preferably 62 μm or less, more preferably 50 μm or less. In order to cope with a decrease in the size of an apparatus and a market demand for a decrease in the thickness of a recording medium capable of recording for a longer period of time, the thickness of the film is preferably 25 μm or less, more preferably 12 μm or less, particularly preferably 2 to 12 μm.

The polyethylene-2,6-naphthalenedicarboxylate forming the film of the present invention is composed mainly from 2,6-naphthalenedicarboxylic acid as an acid component and ethylene glycol as a glycol component, and yet it may be a copolymer composed from 2,6-naphthalenedicarboxylic acid, ethylene glycol, a small amount of other dicarboxylic acid component, and a small amount of other glycol component. Examples of the above dicarboxylic acid component other than 2,6-naphthalenedicarboxylic acid include aromatic dicarboxylic acids such as terephthalic acid, isophthalic acid, diphenylsulfonedicarboxylic acid and benzophenonedicarboxylic acid, aliphatic dicarboxylic acids such as succinic acid, adipic acid, sebacic acid and dodecanedicarboxylic acid, and alicyclic dicarboxylic acids such as hexahydroterephthalic acid and 1,3-adamantanedicarboxylic acid. Examples of the above glycol component other than ethylene glycol include 1,3-propanediol, 1,4-butanediol, 1,6-hexanediol, neopentyl glycol, 1,4-cyclohexanedimethanol and p-xylylene glycol.

The amount of the 2,6-naphthalenedicarboxylic acid based on the total amount of the acid components is preferably at least 80 mol %, particularly preferably at least 90 mol %. The amount of the ethylene glycol based on the total amount of the glycol components is preferably at least 90 mol %, particularly preferably at least 95 mol %.

The above polymer may contain additives such as a stabilizer and a colorant.

The polyethylene-2,6-naphthalenedicarboxylate can be produced by a known method according to a melt-polymerization method. In this production, an additive such as a catalyst may be used as required.

The Polyethylene-2,6-naphthalenedicarboxylate preferably has an intrinsic viscosity, measured in o-chlorophenol at 25° C., of 0.45 to 0.90 dl/g.

The biaxially oriented, unidirectionally long polyethylene-2,6-naphthalenedicarboxylate of the present invention can be produced by a known method, for example, a method in which the polyethylene-2,6-naphthalenedicarboxylate is melt-extruded, preferably at a temperature between its melting point (Tm)°C. and (Tm+70)°C. to form a film, the film is solidified by cooling to obtain an unstretched film, the unstretched film is stretched monoaxially (lengthwise or widthwise) at a temperature between (Tg−10)°C. and (Tg+70)°C. at a predetermined stretch ratio, the Tg referring to the glass transition temperature of the polyethylene-2,6-naphthalenedicarboxylate, the monoaxially stretched film is stretched at right angles to the above stretching direction (widthwise at a second step if the film has been stretched lengthwise at a first step) at a temperature between Tg°C. and (Tg+70)°C. at a predetermined stretch ratio and the biaxially stretched film is heat-treated. In this case, the stretch ratio, the temperature for stretching and the temperature for heat treatment are properly selected to form the film of the present invention having the above-specified properties. The area stretch ratio is 9 to 22, preferably 12 to 22. The thermosetting temperature is preferably selected from between 190° and 250° C., and the time for treating the biaxially stretched film is preferably selected from between 1 and 60 seconds.

Apart from the above consecutive biaxial stretching, the unstretched film may be biaxially stretched at the same time. Further, in the consecutive biaxial stretching, the stretching in the longitudinal direction and the stretching in the transverse direction may be carried out a plurality of times each. For obtaining a film having further improved mechanical properties for example, the above biaxially stretched film before the thermosetting treatment is heat-treated at a thermosetting temperature between (Tg+20)°C. and (Tg+70)°C., stretched in the longitudinal or transverse direction at a temperature higher than the above thermosetting temperature by 10° to 40° C. and stretched in the transverse or longitudinal direction at a temperature higher than the latter temperature by 20° to 50° C., whereby there can be obtained a film having a total stretch ratio of 5.0 to 6.9 in the longitudinal direction and a total stretch ratio of 5.0 to 6.9 in the transverse direction.

In the present invention, examples of the magnetic metal for forming the magnetic layer include cobalt, iron, nickel, alloy of at least two of these metal, alloy of at least one of these metals and at least one of chromium and tungsten. The thin magnetic metal film can be formed by a vacuum vapor deposition method well known per se. A vacuum vapor deposition method is preferred, since the deposition rate is high and the resultant thin film has a high coercive force. The thin metal film has a thickness of approximately 100 to 1,500 nm from the general point of view. The method of forming the thin metal film shall not be limited to the vacuum vapor deposition.

In the magnetic recording tape obtained by forming the thin magnetic metal film as a magnetic recording layer on one surface of the above biaxially oriented, unidirectionally long polyethylene-2,6-naphthalenedicarboxylate film of the present invention, the curling of the substrate film is small in forming the thin metal film, and the magnetic recording tape has a high coercive force as a high-density magnetic recording tape and is substantially free from data dropout and excellent in running properties and durability even if it is a thin tape.

The magnetic recording tape is substantially free from curling even if it has the magnetic layer vapor-deposited thereon, and a degree of distortion (cupping), |Kp|, measured by the method to be described later is 15% or less, particularly as small as 10% or less.

The present invention will be described hereinafter further in detail by reference to Examples. A variety of physical properties and characteristics described in Examples were measured or are defined as follows.

(1) Young's modulus

A film was cut to prepare a sample having a width of 10 mm and a length of 150 mm, and the sample was pulled with an instron type universal tensile tester at an inter-chuck distance of 100 mm, at a pulling rate of 10 mm/minute, at a chart rate of 500 mm/minute and at room temperature to prepare a load-elongation curve, and the Young's modulus was calculated on the basis of a tangent on the rising part of the load-elongation curve.

(2) Heat shrinkage factor

A film having a length of about 30 cm and a width of 1 cm, which had been accurately measured for a length, was placed in an oven set at 105° C. under no load, and heat-treated for 30 minutes. Then, the film was taken out of the oven, allowed to cool to room temperature and measured for a difference in length between before the heat treatment and after the heat treatment. The heat shrinkage factor was determined on the basis of the following equation, $$\text{Heat shrinkage factor (\%)} = \frac{\Delta L}{L_0} \times 100$$

wherein $L_0$ is a length before the heat treatment and $\Delta L$ is a difference in length.

(3) Surface roughness (Ra) of film

A chart (surface roughness curve of a film) was drawn by means of a needle-contacting type surface roughness tester (Surfcoder 30C, supplied by Kosaka Laboratories) having a 2 μm radius needle under a needle pressure of 30 mg. A portion having a measured length L in the direction of its center line is picked up from the surface roughness curve of a film. The center line of this portion picked up was regarded as an X axis, the direction of the length multiplication was regarded as a Y axis, and the roughness curve was expressed as $Y=f(x)$. The value (Ra; μm) given by the following equation was defined as the surface roughness of the film.

$$Ra = \frac{1}{L} \int_0^L |f(x)| dx$$

(4) Electromagnetic conversion characteristics

A magnetic tape for video was measured for an S/N ratio with a noise meter supplied by Shibasoku K.K. Further, a difference between the above S/N ratio and the S/N ratio of the tape of Comparative Example 2 shown in Table 1 was determined. The VTR used for this measurement was EV-S700, supplied by Sony Co. Ltd.

(5) Running durability of magnetic tape

While the running of a magnetic tape with a VTR (EV-S3700, supplied by Sony Co. Ltd.) was initiated and terminated repeatedly for 100 hours, the magnetic tape was examined on running state and measured for output. The magnetic tape was evaluated on its running durability as follows. <Evaluation based on 3 ratings>

◯: A tape edge neither bent nor formed a wavy shape, and no abrasion occurred so that no white dust adhered.

Δ: A tape edge bent or formed a wavy shape to some extent, and adherence of a small amount of white dust was observed.

X: A tape edge clearly bent and formed a wavy shape, and abrasion occurred so greatly that a large quantity of white dust occurred.

(6) Curling (degree of distortion (cupping))

The degree of distortion (cupping) of a magnetic recording tape was evaluated as follows.

A magnetic recording tape sample having a width of $l_0$ (a width of 1.27 cm (½ inch) and a length of 5 cm in Examples) was placed on a flat surface, and the degree of cupping, Kp, was determined on the basis of the following equation, $$K_p = \frac{h_1 + h_2}{2 \times l_0} \times 100 \, (\%)$$

wherein $h_1$ and $h_2$ were heights of the tape ends from the flat surface.

FIG. 1 shows a cross-sectional view of the magnetic tape 1 placed on the flat surface, in which the cupping of the magnetic recording tape 1 occurred with a metal vapor-deposition film 3 being positioned outwardly and a biaxially oriented film 2 being positioned inwardly.

In the above equation, $K_p$ is positive when the cupping occurs with a metal vapor-deposition film being positioned outwardly, and $K_p$ is negative when the cupping occurs with a metal vapor-deposition film being positioned inwardly.

The cupping was evaluated on the basis of the following four ratings, and Table 1 shows the results.

⊚: No cupping occurred.

◯: The cupping occurred to a small degree, or $|K_p| \leq 15\%$.

Δ: The cupping occurred to a considerable degree, or $|K_p| > 15\%$. However, the cupping was not so excessive as to form a cylindrical shape.

X: A sample formed a completely cylindrical shape, and was not measurable for $K_p$ by the above method.

EXAMPLE 1

Polyethylene-2,6-naphthalenedicarboxylate containing 0.05% by weight of silica particles having an average particle diameter of 0.10 μm and having an intrinsic viscosity, measured in o-chlorophenol at 25° C., of 0.62 dl/g was dried at 170° C., and then melt-extruded at 300° C., and the extruded film was rapidly cooled and solidified on a casting drum maintained at 60° C. to give an unstretched film having a thickness of 180 μm.

The above unstretched film was stretched at a stretch ratio of 2.3 in the longitudinal direction at 130° C. and at a stretch ratio of 4.0 in the transverse direction at 130° C., and the stretched film was intermediately heat-treated at 160° C. The resultant film was further stretched at a stretch ratio of 2.4 in the longitudinal direction at 170° C. and at a stretch ratio of 1.5 in the transverse direction at 170° C., and then a coating liquid having the following composition was applied to one surface of the so-stretched film.

| Composition of the coating liquid: | | |
|---|---|---|
| Aluminum acrylate | 2 wt % | 12 kg |
| Polyethylene glycol | 2 wt % | 5 kg |
| Polyethylene glycol diglycidyl ether | 2 wt % | 2 kg |
| Polyoxyethylene nonylphenyl ether | 2 wt % | 1 kg |

The coating liquid was applied in a wet amount of about 2.2 g/m² and the solid content was about 0.0126 g/m².

Then, the above-obtained film was heattreated at 200° C. to give a biaxially oriented, unidirectionally long polyethylene-2,6-naphthalenedicarboxylate film having a thickness of 7 μm, which was taken up.

Then, Co—Ni (Co/Ni weight ratio=75/25) was vapor-deposited on the other surface (uncoated surface) of the above polyethylene-2,6-naphthalenedicarboxylate film by an electron beam vapor-deposition method (askew deposition at a minimum incidence angle of 50°) to form a coating having a thickness of 100 nm, whereby a raw roll for magnetic recording was obtained. A magnetic recording tape was prepared from the raw roll.

Table 1 shows the properties and characteristics of the above-obtained film and tape. Table 1 clearly shows that no curling occurred in the vapor deposition on the substrate film and that the tape was excellent in electromagnetic characteristics, drop-out and running properties.

EXAMPLE 2

An unstretched film was prepared in the same manner as in Example 1 except that the silica particles were replaced with 0.03% by weight of silica particles having an average particle diameter of 0.05 μm. The unstretched film was stretched at a stretch ratio of 2.4 in the longitudinal direction at 130° C. and at a stretch ratio of 4.0 in the transverse direction at 130° C., and the stretched film was intermediately heat-treated at 160° C. The resultant film was further stretched at a stretch ratio of 2.6 in the longitudinal direction at 170° C. and at a stretch ratio of 1.3 in the transverse direction at 170° C. Then, the so-obtained stretched film was treated in the same manner as in Example 1 to obtain a film having a coating on one surface, and a magnetic recording tape was prepared from the film in the same manner as in Example 1. The above-obtained film and tape were as excellent as those obtained in Example 1.

Comparative Example 1

A film and a magnetic recording tape were prepared in the same manner as in Example 1 except that the temperature for the heat treatment after the coating of one surface of the substrate film was changed to 220° C. The tape underwent extraordinary curling as compared with those obtained in Example 1, and was poor in electromagnetic conversion characteristics and running properties.

Comparative Example 2

An unstretched film was obtained in the same manner as in Example 1, and this unstretched film was treated in the same manner as in Example 1 except that it was stretched at a stretch ratio of 3.6 in the longitudinal direction at 125° C. and stretched at a stretch ratio of 3.9 in the transverse direction at 140° C. with a tenter, to obtain a film coated on one surface and heat-treated at 200° C. and a vapor-deposition tape.

Table 1 shows the results. The tape was poor in running durability due to its low Young's modulus. Further, the tape was poor in electromagnetic conversion characteristics since its nerve was insufficient.

Comparative Example 3

An unstretched film was obtained in the same manner as in Example 1, and the unstretched film was stretched at a stretch ratio of 2.3 in the longitudinal direction at 130° C. and at a stretch ratio of 3.8 in the transverse direction at 130° C. Then, the stretched film was intermediately heat-treated at 160° C. Further, this film was stretched at a stretch ratio of 2.3 in the longitudinal direction at 170° C. and at a stretch ratio of 2.0 in the transverse direction at 215° C., and treated in the same manner as in Example 1, to obtain a vapor-deposition magnetic recording tape.

Table 1 shows the results. As compared with the tape obtained in Example 1, the above-obtained tape had a lower Young's modulus in the longitudinal direction than the Young's modulus in the transverse direction. As a result, the contact strength of the tape to a rotary head was small, and the tape was poor in electromagnetic conversion characteristics.

Comparative Example 4

A substrate film having a coating on one surface and a vapor-deposition tape were obtained in the same manner as in Example 1 except that the silica particles were replaced with calcium carbonate particles having an average particle diameter of 0.6 μm. The substrate film had a larger surface roughness than the film obtained in Example 1, and the tape was therefore considerably poor in electromagnetic conversion characteristics.

TABLE 1

|  | Unit | Ex. 1 | Ex. 2 | Comp. Ex. 1 | Comp. Ex. 2 | Comp. Ex. 3 | Comp. Ex. 4 |
| --- | --- | --- | --- | --- | --- | --- | --- |
| Inorganic particles |  |  |  |  |  |  |  |
| Kind | — | Silica | Silica | Silica | Silica | Silica | Calcium carbonate |
| Average particle diameter | μm | 0.10 | 0.05 | 0.10 | 0.10 | 0.10 | 0.60 |
| Amount | wt % | 0.05 | 0.03 | 0.05 | 0.05 | 0.05 | 0.02 |
| Substrate film properties |  |  |  |  |  |  |  |
| Young's modulus |  |  |  |  |  |  |  |
| EM | kg/mm$^2$ | 800 | 990 | 800 | 590 | 650 | 800 |
| ET | kg/mm$^2$ | 750 | 610 | 750 | 560 | 890 | 750 |
| Heat shrinkage factor (transverse direction) 105° C. × 30 min. | % | 2.0 | 1.5 | 0.2 | 1.4 | 2.0 | 1.5 |
| Surface roughness (Ra) | nm | 2.8 | 1.9 | 2.7 | 2.6 | 2.5 | 10 |
| Curling | — | ⊙ | ⊙ | X | ⊙ | ○ | ⊙ |
| Electromagnetic conversion characteristics | dB | +2.0 | +2.5 | −1.5 | 0 | −1.0 | −2.0 |
| Running durability | — | ○ | ○ | X | Δ | Δ | ○ |

What is claimed is:

1. A biaxially oriented, unidirectionally long polyethylene-2,6-naphthalenedicarboxylate film useful as a substrate for a magnetic recording video tape, said film having a first surface and a second surface, wherein the film has the following characteristic properties:

(A) the Young's Modulus in the longitudinal direction and the Young's modulus in the transverse direction are each at least 600 kg/mm$^2$, and the Young's modulus in the longitudinal direction is greater than the Young's modulus in the transverse direction, (B) the heat shrinkage factor in the transverse direction when the film has been treated under no load at 105° C. for 30 minutes is at least 1%, (C) the surface roughness, Ra, of the first surface of the film is up to 5 nm, said first surface being a surface to be coated with a metal layer by vapor deposition and, (D) the heat shrinkage factor in the longitudinal direction when the film has been treated under no load at 105° C. for 30 minutes is up to 1%.

2. The unidirectionally long film of claim 1, wherein the Young's modulus in the longitudinal direction is at least 700 kg/mm$^2$.

3. The unidirectionally long film of claim 1, wherein the heat shrinkage factor in the transverse direction when the film has been treated under no load at 105° C. for 30 minutes is 1 to 3%.

4. The unidirectionally long film of claim 1, wherein the surface roughness, Ra, of said second surface of the film is greater than the surface roughness of said first surface and is 4 to 40 nm.

5. The unidirectionally long film of claim 4, wherein the second surface of the film, after being coated continuously or discretely, has a surface roughness, Ra, of 4 to 40 nm.

6. The unidirectionally long film of claim 1, wherein a film thickness is 75 μm or less.

7. The unidirectionally long film of claim 5 wherein the second surface is coated with an organic polymer containing a lubricant.

8. The unidirectionally long film of claim 7 wherein the second surface is coated to a maximum thickness of 1 μm.

9. The unidirectionally long film of claim 7 wherein the second surface, after being coated continuously or discretely has a surface roughness of 15–40 nm.

10. The unidirectionally long film of claim 1 wherein the second surface, after being coated continuously or discretely has a surface roughness of 15–40 nm.

11. The unidirectionally long film of claim 5 wherein the second surface, after being coated continuously or discretely has a surface roughness of 15–40 nm.

12. The biaxially oriented, unidirectionally long polyethylene-2,6-naphthalenedicarboxylate film according to claim 1 having the following further characteristic property:

(E) the degree of cupping, |Kp≦| , wherein Kp is determined for said film after one surface of which has a metal layer vapor-deposited thereon, is 15% or less.

13. The biaxially oriented, unidirectionally long polyethylene-2,6-naphthalenedicarboxylate film according to claim 12 wherein the degree of cupping, |Kp|, after a metal layer is vapor deposited on one surface thereof, is 0%.

14. The biaxially oriented, unidirectionally long polyethylene-2,6-naphthalenedicarboxylate film according to claim 1 having a film thickness of 50 μm or less.

15. The biaxially oriented, unidirectionally long polyethylene-2,6-naphthalenedicarboxylate film according to claim 1 having a film thickness of from 2 to 12 μm.

16. The biaxially oriented, unidirectionally long polyethylene-2,6-naphthalenedicarboxylate film according to claim 1 which is prepared by the steps comprising:

i) melt-extruding polyethylene-2,6-naphthalenedicarboxylate at a temperature higher than its melting temperature, Tm, to form a film;

ii) cooling the resulting film to obtain an unstretched film;

iii) consecutively or simultaneously stretching the unstretched film in the widthwise and lengthwise directions to obtain a biaxially stretched film; and iv) heat treating the biaxially stretched film; wherein the stretching ratio and stretching temperature in step (iii) and the heat treating temperature in step (iv) are selected to form a film having the above physical properties.

* * * * *